United States Patent [19]
Guillemet

[11] Patent Number: 5,485,705
[45] Date of Patent: Jan. 23, 1996

[54] CORNER ASSEMBLY FOR A SCREEN FRAME

[75] Inventor: Guy Guillemet, Tenebonne, Canada

[73] Assignee: Bay Mills Ltd., Ontario, Canada

[21] Appl. No.: 409,353

[22] Filed: Mar. 23, 1995

Related U.S. Application Data

[62] Division of Ser. No. 122,887, Sep. 16, 1993.

[51] Int. Cl.⁶ .................................................... E06B 9/00
[52] U.S. Cl. ...................... 52/656.9; 52/656.7; 160/381; 49/185; 403/231; 403/403
[58] Field of Search ................................ 52/656.9, 656.1, 52/656.2, 656.7, 656.5, 213, 215, 208, 204.1, 204.55; 160/105, 381, 280, 290.1; 403/295, 402, 403, 231, 205; 49/185

[56] References Cited

U.S. PATENT DOCUMENTS 1,767,487  6/1930  Shogren.
3,782,054  1/1974  Goss, Jr. ................................. 403/295
4,862,612  9/1989  Sugihara et al. .................... 403/402 X

*Primary Examiner*—Lanna Mai
*Attorney, Agent, or Firm*—Paul & Paul

[57] ABSTRACT

A corner assembly, for holding a screen frame, is provided in which the corner assembly has a pair of arms disposed to be connected to frame side members, preferably by being telescopically received therein, for installation inside a fixed frame at the periphery of a window. Each corner assembly includes a slide member carried in a slideway, which slide member carries a retaining protrusion extending therefrom, and with the slide member having a manually engageable, movable button, movable longitudinally, to move the slide member and its protruding button between two positions, one position of which is an extended position for the retaining protrusion, and another position of which is a retracted position therefor. In the extended position of the retaining protrusion, the protrusion is adapted to engage within a recess of a fixed frame member of a window.

7 Claims, 2 Drawing Sheets

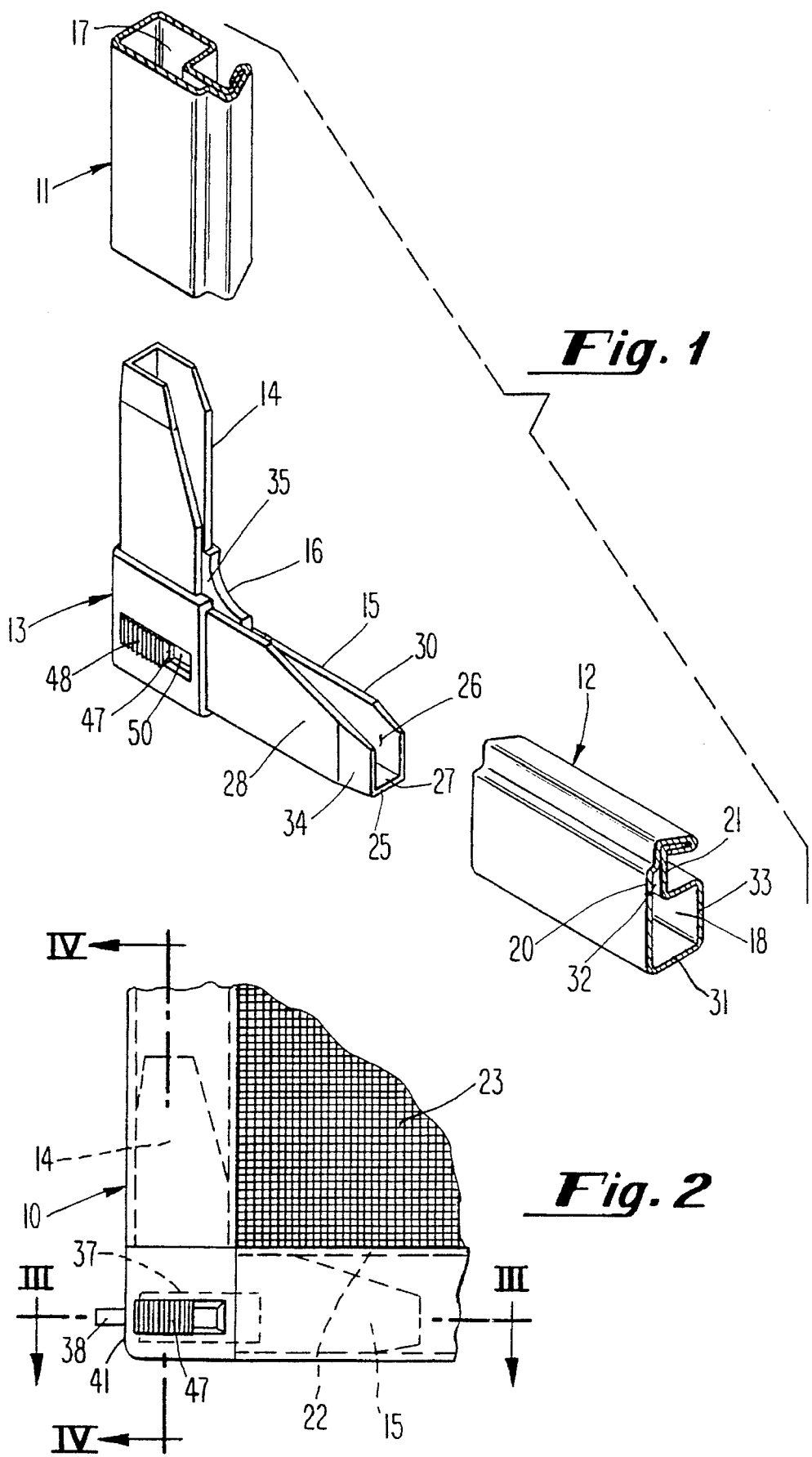

CORNER ASSEMBLY FOR A SCREEN FRAME

This is a divisional of application Ser. No. 08/122,887 filed Sep. 16, 1993.

BACKGROUND OF THE INVENTION

In the art of window manufacture, it is known to provide windows with fixed frames, in which movable frames are disposed. The movable frames may carry screening therein, for ventilation purposes.

It is also known, in the art of window manufacture, that movable frame assemblies are disposed within fixed frame assemblies, for raising or lowering screens or the like, for pivotally moving screens or the like, for facilitating placement, cleaning, or for any other purposes and/or for adjustment of the position of the movable frame assembly that comprises the screen or the like, within the fixed frame.

One example of a prior art type of frame corner bracket is disclosed in U.S. Pat. No. Des. 307,078 dated Apr. 10, 1990, which represents a corner bracket for holding an insect screen, or the like, that may be inserted into an exterior frame.

THE PRESENT INVENTION

The present invention is directed toward providing a frame assembly that includes a corner assembly for an insect screen, or the like, in which means are provided for efficiently providing a retaining mechanism for retaining the movable frame assembly into a fixed frame, for any of various purposes, such as for securement of the movable frame in a retained position, for facilitating a desired position of the movable frame assembly relative to a fixed frame, etc.

Accordingly, it is a primary object of this invention to provide a novel corner assembly and frame comprising such assembly, in which a frame assembly for a screen or the like is provided with a slidable locking mechanism.

It is another object of this invention to provide a corner assembly for a removable frame, in accordance with the foregoing object.

It is another object of this invention to provide an efficient retaining mechanism of the slide type, for use with a corner assembly for a movable or removable frame assembly for a screen or the like.

Other objects and advantages of the present invention will be readily understood, upon a reading of the following brief descriptions of the drawing figures, detailed descriptions of the preferred embodiments, and the appended claims.

BRIEF DESCRIPTIONS OF THE DRAWING FIGURES

FIG. 1 is a fragmentary, perspective, exploded view of the corner assembly of this invention and portions of side members of a movable or removable frame, to which the corner assembly is connected.

FIG. 2 is a fragmentary front view of a lower left corner of a movable or removable screen frame assembly, including a corner assembly, in accordance with this invention.

DETAILED DESCRIPTIONS OF THE PREFERRED EMBODIMENTS

Figure 3:
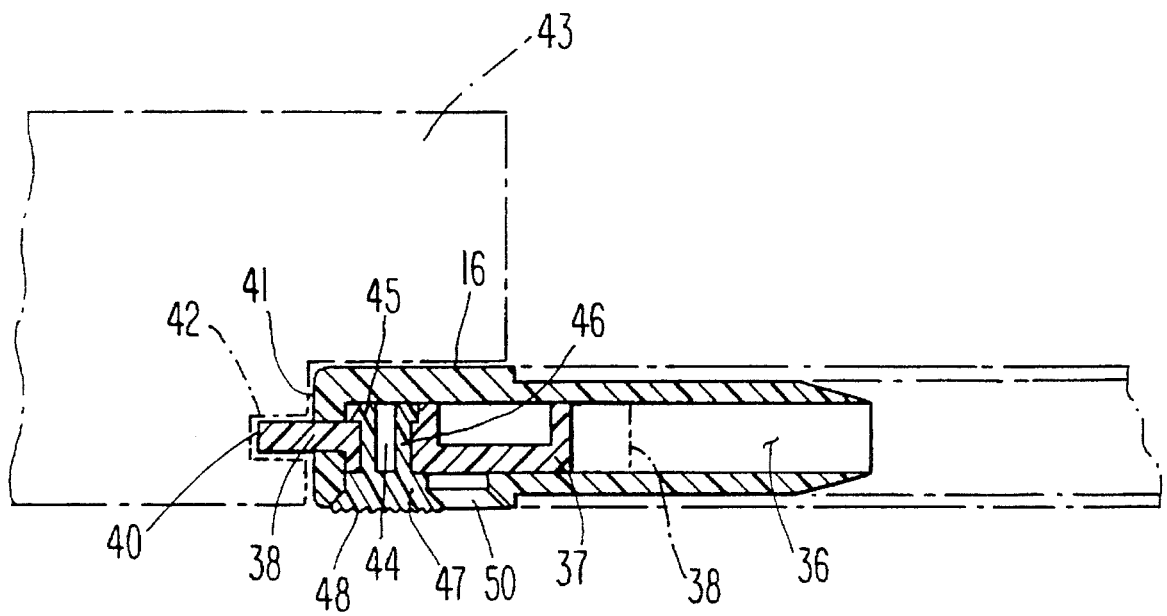
FIG. 3 is a horizontal, sectional view taken through the corner assembly shown in FIG. 2, generally along the line III—III of FIG. 2, with the retaining protrusion of the corner assembly being shown disposed in retaining relation in a portion of a fixed frame assembly, that in turn, is illustrated in phantom in FIG. 3.

Referring now to the drawings in detail, reference is first made to FIG. 1, wherein the movable frame assembly that is shown in FIG. 2, is seen as comprising a pair of side frame members 11 and 12, generally disposed about 90° apart, and a corner assembly 13.

The corner assembly 13 has a pair of connector arms 14, 15 extending outwardly from a corner connector portion 16, generally at 90° relative to each other as shown, for facilitating telescopic receipt of the arms 14, 15, into corresponding channels or other openings 17, 18, respectively, of the frame side members 11, 12, which telescopic receipt of such arms 14, 15 is thus shown in the dotted line showing for the arms in FIG. 2.

The cross-sectional configuration for the frame side members 11, 12, may be of the roll formed or extruded U-shaped construction 20, 21 shown for example, in FIG. 1, for the frame side member 12, with the channel 18 opening upward, as shown, for receipt therein of a peripheral bead 22 for a screen 23 (see FIG. 2) therein, as shown. It will be understood that there will preferably be four such frame side members 11, 12, comprising the periphery of the movable or removable frame 10, with retaining corner assemblies 13, preferably at each of the four corners thereof.

Each arm 14, 15 of the corner assembly 13 will preferably also have a U-shaped configuration 25, opening into a channel 26, as shown in FIG. 1, including a base 27, arms 28, 30, adapted to be resiliently received in gripping telescopic relation within side members 11, 12. In the particular arrangement shown, the portions 27, 28 and 30 of the arm 15 are respectively received within zones 31, 32, 33 of frame side member 12 as shown in FIG. 1. It will be noted that the outer end of each of arm portions 27, 28 and 30 is chamfered as shown at 34.

It will also be understood that the arm 14 is constructed generally similar to that of 15, as shown, for likewise telescopic connection to the frame side member 11.

Figure 4:
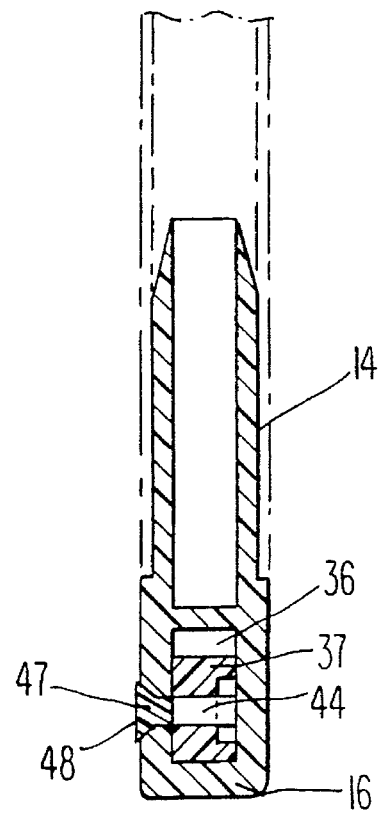
FIG. 4 is a vertical sectional view taken through the corner assembly of FIG. 2, generally along the line IV—IV of FIG. 2.

At the left end of the U-shaped opening 26 of the arm 15, and continuing into the interior 35 of the corner junction 16, is a slideway 36, as shown in FIG. 4. The slideway 36 houses therein a slide member 37, movable therein between the full line position therefor shown in FIG. 3 and the phantom line position therefor 38, also shown in FIG. 3, with the slide member 37 being of generally rectangular configuration, as shown in dotted lines in FIG. 2.

Fixedly carried on the left end of the slide member 37, and preferably unitary therewith, is a retaining protrusion 38, such that when the slide member 37 has its right-most end as shown in FIG. 3 in the phantom line position 38 illustrated in FIG. 3, the left-most end 40 of the retaining protrusion 38 is either even with the left-most end 41 of the corner connector 16, or is slightly sunken (not shown), relative thereto, such that it does not protrude outwardly thereof. When the slide member 37 is in the full line position therefor shown in FIG. 3, the retaining protrusion 38 is in the extended position shown in FIG. 3, adapted to be engaged within a recess 42 in a fixed frame member 43, preferably disposed about the movable or removable frame member 10, in which the movable or removable frame member 10 will preferably be received.

Alternatively, the slide member 37 could be of multiple-piece construction, such as in the form of a two-piece snap-in arrangement, not shown herein.

A slot 44 is provided in the slide member 37, in which a pair of locking tangs 45, 46 of a button 47 are received, in resilient engagement therewith, as shown in FIG. 3, with the button 47 having a manually engageable, slightly protruding and/or knurled outer surface 48, for engagement by preferably the thumb of a user, for sliding the slide member 37 within the slideway 36, by engaging the surface 48 of the button 47 and moving the same leftward and rightward within its guideway 50 as shown in FIG. 3.

Thus, it will be seen that the slide member 37 moves parallel with and within the slideway 36, upon movement of the button 47 within its guideway 50, also parallel therewith.

It will also be seen that the corner assembly is preferably constructed of only three components; namely, the corner connector 16 with its extending arms 14 and 15 comprising one component, with the slide member 37 comprising another component, and with the retaining button 47 comprising the third component. Alternatively, the corner assembly could be made of a fewer or greater number of components. It will also be understood that the device of the present invention may be constructed such that the components of the corner assembly are of thermoplastic construction, which lends itself to ready slidability of the sliding components within their slideways/guideways; that the corner assemblies are readily adaptable for insertion into side frame members that are of any compatible construction, such as aluminum, steel, vinyl or other appropriate materials, and which lend themselves to adaptation to various color schemes, or the like.

It will further be understood that various modifications may be made in the details of constructions, as well as in the use and operation of the components of the present invention, all within the spirit and scope of the invention as defined in the appended claims.

I claim:

1. A corner assembly for a frame for a screen or the like, with the assembly comprising a corner connector having a corner junction and a pair of connector arms disposed at approximately 90° relative to each other; with said connector arms being spaced apart from each other by said corner junction, and with said corner junction including at least one exterior face, with the corner connector having a slideway therein disposed parallel to, and at least partially within one of its said arms; with a slide member carried in said slideway in sliding engagement with said slideway, between extended and retracted positions therein; with said slide member having a retaining protrusion extending therefrom, in a direction generally parallel to said slideway; said protrusion extending in protruding relation beyond said corner connector in the extended position of said slide member and being substantially entirely disposed in retracted relation within said corner connector in the retracted position of said slide member; and including a retaining button carried by said slide member and being adapted to be manually engaged by a user for moving said slide member between extended and retracted positions thereof, including an elongated opening in the exterior face of the corner junction, generally parallel with said slideway and connecting said slideway with the exterior of said corner junction, and with said retaining button extending from said slide member to the exterior of the corner junction through said opening, for traversal of said button along said opening as said slide member moves between retracted and extended positions.

2. The assembly of claim 1, wherein said corner assembly is comprised of only the following three separate parts;
    a) a corner connector;
    b) a slide member; and
    c) a button.

3. The assembly of claim 1, with said button having a face and shank; and with the shank extending through said opening and being carried by said slide member.

4. The assembly of claim 3, wherein the face of said button includes means for facilitating manual engagement thereof.

5. The assembly of claim 1, wherein said corner assembly is comprised of thermoplastic components.

6. The assembly of claim 1, wherein said retaining protrusion is of unitary construction with said slide member.

7. The assembly of claim 1, including an elongated opening in the corner connector, generally parallel with said slideway and connecting said slideway with the exterior of said corner connector; and with said retaining button extending from said slide member to the exterior of the corner connector through said opening, for traversal of said button along said opening as said slide member moves between retracted and extended positions; with said button having a face and shank; and with the shank extending through said opening and being carried by said slide member; wherein the face of said button includes means facilitating manual engagement thereof; wherein said corner assembly is comprised of thermoplastic components; wherein said corner assembly is comprised of the following three separate parts;
    a) a corner connector;
    b) a slide member;
    c) a button; and
wherein said protrusion is of unitary construction with said slide member.

* * * * *